US011854050B2

(12) United States Patent
Chatterton et al.

(10) Patent No.: US 11,854,050 B2
(45) Date of Patent: Dec. 26, 2023

(54) MANAGING MULTIPLE BEACONS WITH A NETWORK-CONNECTED PRIMARY BEACON

(71) Applicant: PayPal, Inc., San Jose, CA (US)

(72) Inventors: Geoffrey W. Chatterton, Los Altos, CA (US); John Hastings Granbery, Los Altos, CA (US)

(73) Assignee: PAYPAL, INC., San Jose, CA (US)

( * ) Notice: Subject to any disclaimer, the term of this patent is extended or adjusted under 35 U.S.C. 154(b) by 8 days.

(21) Appl. No.: 17/875,615

(22) Filed: Jul. 28, 2022

(65) Prior Publication Data

US 2023/0093566 A1 Mar. 23, 2023

Related U.S. Application Data

(63) Continuation of application No. 16/379,664, filed on Apr. 9, 2019, now Pat. No. 11,403,679, which is a
(Continued)

(51) Int. Cl.
*G06Q 30/02* (2023.01)
*G06Q 20/32* (2012.01)
(Continued)

(52) U.S. Cl.
CPC ......... *G06Q 30/0281* (2013.01); *G06F 21/44* (2013.01); *G06Q 20/20* (2013.01);
(Continued)

(58) Field of Classification Search
CPC .................................................. G06Q 30/0281
See application file for complete search history.

(56) References Cited

U.S. PATENT DOCUMENTS 6,831,896 B1  12/2004 Lempio et al.
2004/0098350 A1* 5/2004 Labrou ................. G06Q 20/12
705/64

(Continued)

OTHER PUBLICATIONS

Bluetooth Low Energy, Beacons and Retail; Verifone; Erik Viugt; Oct. 23, 2013 available at: http://global-old.verifone.com/media/3603729/bluetooth-low-energy-beacons-retail-wp.pdf (last visited 004/14/2023) (Year: 2013).*

(Continued)

*Primary Examiner* — Emmett K. Walsh
(74) *Attorney, Agent, or Firm* — Haynes and Boone, LLP

(57) ABSTRACT

Systems and methods are provided which allow for the management of multiple beacons using a network-connected primary beacon in communication with the multiple beacons. The primary beacon may be in communication with the other beacons in the network using a low power wireless technology, such as Bluetooth® low energy (BLE). The primary beacon may receive updates and content from a server over a network to which the primary beacon is in communication, and then send the received updates and content to the other beacons. Moreover, the other beacons may periodically provide updates or collect information and provide this information to the primary beacon, which can then send the updates or collected information to the server for storage and/or analysis.

20 Claims, 9 Drawing Sheets

Related U.S. Application Data continuation of application No. 14/662,757, filed on Mar. 19, 2015, now Pat. No. 10,255,623.

(60) Provisional application No. 61/955,749, filed on Mar. 19, 2014.

(51) Int. Cl.
   *H04W 4/021* (2018.01)
   *G06F 21/44* (2013.01)
   *G06Q 20/20* (2012.01)
   *H04W 4/21* (2018.01)
   *H04W 4/80* (2018.01)

(52) U.S. Cl.
   CPC ........ *G06Q 20/3224* (2013.01); *H04W 4/021* (2013.01); *H04W 4/21* (2018.02); *H04W 4/80* (2018.02); *Y02D 30/70* (2020.08)

(56) References Cited

U.S. PATENT DOCUMENTS

| | | | |
|---|---|---|---|
| 2006/0087474 | A1 | 4/2006 | Do et al. |
| 2009/0034498 | A1 | 2/2009 | Banerjea et al. |
| 2011/0178863 | A1* | 7/2011 | Daigle ............... G06Q 30/0248 705/14.69 |
| 2012/0123844 | A1 | 5/2012 | Fano et al. |
| 2012/0252418 | A1* | 10/2012 | Kandekar ............. H04W 4/021 455/414.1 |
| 2013/0103608 | A1 | 4/2013 | Scipioni et al. |
| 2013/0181045 | A1* | 7/2013 | Dessert .............. G06Q 30/0601 235/383 |
| 2013/0230035 | A1 | 9/2013 | Grandhi et al. |
| 2013/0281084 | A1 | 10/2013 | Batada et al. |
| 2014/0082707 | A1 | 3/2014 | Egan et al. |
| 2014/0108084 | A1 | 4/2014 | Bargetzi et al. |
| 2014/0365334 | A1* | 12/2014 | Hurewitz ........... G06Q 30/0613 705/26.41 |
| 2015/0134374 | A1 | 5/2015 | Schulz et al. |
| 2015/0178652 | A1 | 6/2015 | Schulz et al. |
| 2016/0029155 | A1 | 1/2016 | Kerr et al. |

OTHER PUBLICATIONS

International Appl. No. PCT/US2015/021610, International Search Report and Written Opinion dated Jun. 26, 2015, 10 pages.

Vulgt E., "Bluetooth Low Energy, Beacons and Retail", VeriFone, Oct. 23, 2013 retrieved from: http://global-old.verifone.com/media/3603729/bluetooth-low-energy-beacons-retail-wp.pdf, last visited Nov. 9, 2018, 12 pages.

* cited by examiner

MANAGING MULTIPLE BEACONS WITH A NETWORK-CONNECTED PRIMARY BEACON

CROSS REFERENCE TO RELATED APPLICATION

This present application is a continuation of U.S. patent application Ser. No. 16/379,664 filed Apr. 9, 2019, which is a continuation of U.S. patent application Ser. No. 14/662,757 filed Mar. 19, 2015, now U.S. Pat. No. 10,255,623, which claims priority to U.S. Provisional Patent Application Ser. No. 61/955,749, filed Mar. 19, 2014, which are hereby incorporated by reference in their entirety.

TECHNICAL FIELD

Embodiments disclosed herein are related to systems and methods for managing multiple beacons in a location with a primary beacon connected to a network and in communication with a server.

BACKGROUND

Due to the increase in use of mobile devices and the improved networking and online capabilities of these mobile devices, merchants having physical "brick and mortar" storefronts may also have mechanisms for delivering advertisements and other information to the mobile devices while a user of the mobile device is in the merchant store. Some merchants may take advantage of platforms and services that allow a user to check-in to the merchant or other location that they are in to deliver advertisements, specials, and other information. This allows the merchant to know that the user is at the store and provide specials and other information to the user. If the user is checking in via a social network, the user may also provide feedback about the merchant which may be useful or helpful for the merchant. If the user is checking in via a payment processing service, the user may be provided with options for selecting, ordering, and paying for items through the payment processing service when checking in, providing convenience for both the user and the merchant. Thus, checking in may provide benefits for both the user and the merchant. However, users may have to perform the tedious process of checking in every time that they visit the merchant. If the user does not check-in on every visit, then neither the user nor the merchant fully benefits from checking in. Further, a merchant may provide many devices throughout the location in order to ensure that a customer is always within range of a device that can perform check-ins and deliver advertisements, offers, or invoices to the customer device; however, use of multiple network capable devices may be expensive to the merchant.

Figure 1:
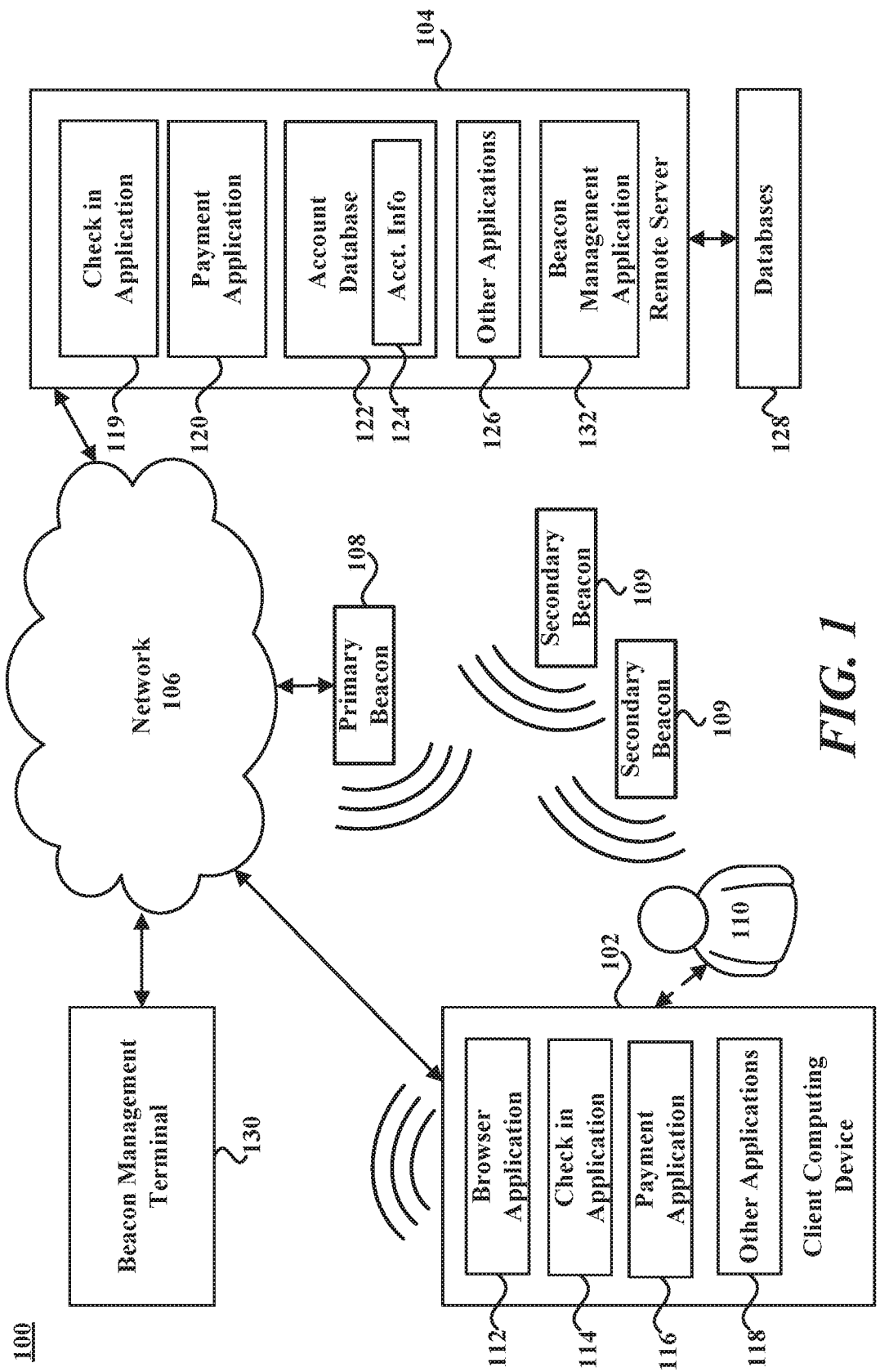
FIG. 1 is a block diagram of a networked system, consistent with some embodiments.

In the drawings, elements having the same designation have the same or similar functions.

DETAILED DESCRIPTION

Provided are methods that provide for managing multiple beacons with a network-connected primary beacon. Systems suitable for practicing methods of the present disclosure are also provided.

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, may be made without departing from the scope of this present disclosure.

Thus, systems and methods for deploying devices or beacons throughout a location are disclosed, such that a customer may always be in communication with a beacon and be able to interact with the beacon that is cost effective and allows for the use of cheaper beacons that do not have network connectivity. Embodiments provided herein utilize a network-connected primary beacon (which may be referred to as a "Queen Beacon"), that is in communication with a server through the network and in communication with other, cheaper beacons placed throughout the location through a Bluetooth® Low Energy (BLE) communications protocol. The primary beacon can be used to interact with a customer or user device to facilitate check-ins and payments with the server over the network and can be used to propagate content and updates to the secondary beacons throughout the location. Further, the secondary beacons can provide information about the customer or user to the primary beacon when the user device comes into communication range or established a communication with the secondary beacon such that the primary beacon can provide this information to the server to determine a sub-, micro-, or partial-location of the user with the overall location based on the secondary beacons to which the user is in communication.

FIG. 1 is a block diagram of a networked system 100, consistent with some embodiments. System 100 includes a client computing device 102 and a remote server 104 in communication over a network 106. Remote server 104 may be a payment service provider server that may be maintained by a payment service provider, such as PayPal, Inc. of San Jose, CA. Remote server 104 may be maintained by other service providers in different embodiments. Remote server 104 may also be maintained by an entity with which sensitive credentials and information may be exchanged with client computing device 102. Remote server 104 may further be one or more servers that host functionality for users to "check-in" to a location, event, and the like. Checking in may provide the user that checks in with special offers, deals, and the like, and may let the merchant or other proprietor of the location or event know that the user is there. The user may also check-in to a location for social purposes to let friends and contacts of the user know that they have checked in. The user may also check-in to a location to pay for items. Remote server 104 may be more generally a web site, an online content manager, a service provider, such as a bank, or other entity who provides content to a user requiring user authentication or login.

Network 106, in one embodiment, may be implemented as a single network or a combination of multiple networks. For example, in various embodiments, network 106 may include the Internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet.

Client computing device 102, in one embodiment, may be implemented using any appropriate combination of hardware and/or software configured for wired and/or wireless communication over network 106. For example, client computing device 102 may be implemented as a wireless telephone (e.g., smart phone), tablet, personal digital assistant (PDA), notebook computer, personal computer, a connected set-top box (STB) such as provided by cable or satellite content providers, or a video game system console, a head-mounted display (HMD) or other wearable computing device, including a wearable computing device having an eyeglass projection screen, and/or various other generally known types of computing devices.

As shown in FIG. 1, system 100 may include one or more primary beacons 108 and secondary beacons 109. In some embodiments, beacons 108 and 109 may be installed at a merchant location, such as a store, restaurant, and the like. In some embodiments, beacons 108 and 109 may be Bluetooth™ Low Energy (BLE) beacons. BLE is a technology that transmits information at a frequency of about 2.4 GHz (about 2042-2480 MHz) over forty (40) 2-MHz wide channels, and has a range of about 50 meter or about 160 feet. Information transmitted according to the BLE protocol may be transmitted at a rate of about 1 Mbit/s with an application throughput of about 0.27 Mbit/s. In some embodiments, BLE communications may be secured using 128-bit Advanced Encryption Standard (AES) encryption with counter mode with a cipher block chaining message authentication code (CBC-MAC) and user defined security. Further, in some embodiments, BLE communications may utilize adaptive frequency hopping, lazy acknowledgement, a 24-bit cyclic redundancy check (CRC) and 32-bit message integrity check for robustness. Moreover, in some embodiments, BLE-capable devices may consume a fraction of the power of standard Bluetooth® devices due to the protocol allowing low duty cycles, and being designed for applications that may not require continuous data transfer. Beacons 108 and 109 may transmit one or more sequences of information such that when a device such as client computing device 102 capable of receiving information from beacons 108 and 109 comes within the range of a beacon 108 or 109, the device may receive a transmission from a beacon 108 or 109 and be instructed to perform an action, such as display an advertisement, execute a payment application, or activate a check-in application to check a user 110 in to a particular location. In some embodiments, primary beacon 108 may be in communication with remote server 104 over network 106 through wireless or wired connection and secondary beacons 109 may be in communication with primary beacon 108 through connection established using BLE communications protocol.

A primary beacon 108 may correspond to any beacon having network capabilities, for example, over network 106 with a remote server 104 in order to utilize one or more features of remote server 104. In contrast, secondary beacons 109 may require use of primary beacon 108 to communicate over network 106, such as by communicating information to primary beacon 108 for transmission to remote server 104 and/or receiving information from primary beacon 108 that was received by primary beacon 108 over network 106 (e.g., from remote server 104). Thus, secondary beacons 109 provide less network capabilities that primary beacon 108, and may be configured so as only to provide short range wireless communications, such as through BLE, NFC, or other short range wireless communication protocol. In this regard, secondary beacons 109 may not have Internet capabilities, or capabilities to communicate over a larger sized (broad) area network, such as a wide area network. In such embodiments, secondary beacons 109 may rely on primary beacon 109 as a point of contact to communicate over such a network.

Client computing device 102 may include any appropriate combination of hardware and/or software having one or more processors and capable of reading instructions stored on a tangible non-transitory machine-readable medium for execution by the one or more processors. Consistent with some embodiments, client computing device 102 includes a machine-readable medium, such as a memory (not shown) that includes instructions for execution by one or more processors (not shown) for causing client computing device 102 to perform specific tasks. In some embodiments, the instructions may be executed by the one or more processors in response to interaction by user 110. For example, such instructions may include browser application 112 such as a mobile browser application, which may be used to provide a user interface to permit user 110 to browse information available over network 106, including information hosted by remote server 104. For example, browser application 112 may be implemented as a web browser to view information available over network 106. Browser application 112 may include a graphical user interface (GUI) that is configured to allow user 110 to interface and communicate with remote server 104 or other servers managed by content providers or merchants via network 106. For example, user 110 may be able to access websites to find and purchase items, as well as access user account information or web content.

Client computing device 102 may also include a check-in application 114 that may allow user 110 to check-in to a location using a check-in platform or service such as may be provided by PayPal, Inc. of San Jose, CA, Foursquare of New York, NY, Facebook, Inc., of Menlo Park, CA, Google+ of Google, Inc. of Mountain View, CA, or Yelp Inc. of San Francisco, CA, and implemented by remote server 104. In some embodiments, check-in application may include multiple application programming interfaces (APIs) for checking in to one or more of the check-in platforms or services. In some embodiments, checking in to a location while visiting a location such as a merchant physical storefront may provide user with exclusive deals, offers, or may allow user to purchase and pay for items. In particular, once user 110 has checked into a location using client computing device 102, a merchant or proprietor of the location may be able to provide deals, incentives, offers, and the like to user 110 through a BLE message sent from beacons 108 or 109 to client computing device 102.

Client computing device 102 may also include a payment application 116 that may be used by user 110 using client computing device 102 to make a payment. In some embodiments, payment application 116 may be configured to make a payment using remote server 104 as a payment processor. In some embodiments, functionalities provided by check-in application 114 and payment application 116 may actually be provided by a single application. Client computing device 102 may include other applications 118 as may be desired in one or more embodiments to provide additional features available to user 110, including accessing a user account with remote server 104. For example, applications 118 may include interfaces and communication protocols that allow the user to receive and transmit information through network 106 and to remote server 104 and other online sites. Applications 118 may also include security applications for implementing client-side security features, programmatic client applications for interfacing with appropriate APIs over network 106 or various other types of generally known programs and/or applications. Applications 116 may include mobile applications downloaded and resident on client computing device 102 that enables user 110 to access content through the applications.

Remote server 104, according to some embodiments, may be maintained by an online payment provider, such as PayPal, Inc. of San Jose, CA, which may provide processing for online financial and information transactions on behalf of user 110. Remote server 104, according to some embodiments, may also be maintained by a service that processes check-ins so that a proprietor of a location, such as a merchant, or others know that user 110 is at the location and is able to provide content to user 110 as a result of the check-in. Remote server 104 may also be capable of providing access to a merchant's goods and services (collectively referred to as "items") that are for purchase and may provide a payment service processing for the purchased items. Remote server 104 may include at least check-in application 119, which may be configured to interact with client computing device 102 connected to network and remote server 104 to check user 110 in to a location. In some embodiments, checking client computing device 102 in to a location may allow user 110 and client computing device 102, to access features, incentives, specials, offers, and the like offered by the location. In some embodiments, these features, specials, offers, and the like may be provided and processed by remote server 104 on behalf of the location, and may be delivered to user 110 by sending such content over network 106 to primary beacon 108, which may then propagate the information to secondary beacons 109 to push to client computing device 102. In some embodiments, check-ins may be automatic check-ins made through the communication of client computing device 102 and primary beacon 108, such as described in U.S. patent application Ser. No. 13/938,860, filed on Jul. 10, 2013, and U.S. patent application Ser. No. 14/021,045, filed on Sep. 9, 2013, the entire contents of both of these applications which are hereby incorporated by reference in their entirety.

Remote server 104 may also include a payment application 120 that may facilitate processing payments for user 110 to merchants, for example. In some embodiments, payment application 120 may be configured to interface with payment application 116 to receive payment details, user information, merchant information, and additional information for processing a payment on behalf of user 110. Payment application 120 may also be capable of interfacing with check-in application 119 such that when a check-in is processed a payment may be authorized for the location in which user 110 is checking in to. In some embodiments, functionalities provided by check-in application 119 and payment application 120 may actually be provided by a single application. Remote server 104 may also include an account database 122 that includes account information 124 for users having an account on remote server 104, such as user 110. In some embodiments, payment application 120 may process payments based on information in account information 124 of account database 122. Remote server 104 may include other applications 126 and may also be in communication with one or more external databases 128, that may provide additional information that may be used by remote server 104. In some embodiments, databases 128 may be databases maintained by third parties, and may include third party account information of user 110.

As used herein, user 110 may have an account with remote server 104 such that account information 124 includes information about user 110. When user 110 checks in with remote server 104 or performs other authentication with remote server 104, client computing device 102 may be associated with user 110 such that remote server 104 recognizes client computing device 102 as being associated with user 110. In some embodiments, remote server 104 may send a cookie or other object to client computing device 102 that provides an indication of the association between user 110 and client computing device 102. Further, account information 124 may include information about user 110 and client computing device 102 as client computing device 102 interacts with beacons 108 and 109. For example, as user 110 having client computing device 102 moves through a location, user 110 may check-in to the location through primary beacon 108 and then move into the range of secondary beacon 109, connect, and then move into the range of a different secondary beacon 109 and connect. Secondary beacons 109 may provide this connection information to primary beacon 108, which may then provide this information to remote server 104 over network 106 to include in account information 124. In some embodiments, this information may be able to be used to determine a sub- or micro-location of user 110 as user 110 moves around the location (e.g., a more specific location of user 110 in an overall location).

System 100 may also include a beacon management terminal 130. In some embodiments, beacon management terminal 130 may be a computing system capable of communicating with primary beacon 108 over network 106 and managing primary beacon 108 and secondary beacons 109. Beacon management terminal 130 may be a dedicated management terminal set up at a location. Beacon management terminal 130 may be a computing system having instructions stored thereon that, when executed by one or more processors of the computing system, allows a user to manage primary beacon 108 and secondary beacons 109 through primary beacon 108. In some embodiments, the instructions may cause the computing system to provide a management portal that may allow an information technology (IT) administrator or personnel at the location in which beacons 108 and 109 are installed to manage primary beacon 108 and secondary beacons 109 through primary beacon 108. Although beacon management terminal 130 is described as different than remote server 104, in various embodiments one or more of the described functions of beacon management terminal 130 may be included in remote server 104, and vice versa.

In some embodiments, beacon management terminal 130 may allow a user to observe the health and status of primary beacon 108 and secondary beacons 109. For example, secondary beacons 109 may be configured to provide health and status updates to primary beacon 108 periodically, with such updates providing information such as a battery or power level of secondary beacons 109, a signal strength of secondary beacons 109, and whether or not secondary beacons 109 are currently connected to primary beacon 108. In some embodiments, if secondary beacon 109 provides information to primary beacon 108 indicating a weak signal strength or primary beacon 108 does not receive information from secondary beacon 109, a user monitoring beacons 108 and 109 through beacon management terminal 130 may determine that a secondary beacon 109 is malfunctioning, in need of power, or has been moved or even removed from the location.

Secondary beacons 109 may be capable of monitoring signal strengths of other secondary beacons 109 in range, and providing these signal strengths to primary beacon 108. These signal strengths may be used to provide location triangulation of secondary beacons 109 within a location. Moreover, the location triangulation may be used to determine a position or sub- or micro-location of user 110 having client computing device 102 as user 110 moves amongst and around secondary beacons 109. Secondary beacon 109 may also be capable of reporting an operating temperature to primary beacon 108 which, when viewed by a user using beacon management terminal 130, may provide additional information about the operating status of secondary beacon 109, with a high operating temperature possibly being indicative of malfunction and/or need of replacement or fixing.

In some embodiments, a user at beacon management terminal 130 may be capable of performing actions with respect to beacons 108 or 109. For example, a user may be capable of changing the advertising information included on secondary beacon 109 such that an advertisement or other incentive being provided by secondary beacon 109 can be changed using beacon management terminal 130. In some embodiments, beacon management terminal 130 may be capable of sending the new advertisement or incentive to primary beacon 108 over network, which may then distribute the new advertisement or incentive to one or more secondary beacons 109, as appropriate. Moreover, beacon management terminal 130 may send the new advertisement to remote server 104 over network 106, wherein remote server 104 delivers the new advertisement to primary beacon 108 over network for distribution to one or more secondary beacons 109. A user at beacon management terminal 130 may be capable of performing additional actions with respect to secondary beacons 109, including changing a signal strength, changing functions of secondary beacons 109 (i.e., check-in or advertisement, or both).

The information provided to primary beacon 108 by secondary beacons 109 may be provided via a short range wireless communications protocol. In some embodiments, the information may be available to beacon management application 132 on remote server 104 from primary beacon 108, where the information may be provided to remote server 104 by primary beacon 108 in some embodiments or may be retrieved by remote server 104 from primary beacon 108 in some embodiments. Moreover, in some embodiments, beacon management terminal 130 may be in communication with remote server 104 and be capable of accessing the information and/or performing actions on secondary beacons 109 using primary beacon 108 as a proxy as facilitated by beacon management application 132. Further, beacon management application 132 may be capable of publishing a webpage accessible by beacon management terminal 130 that provides the information of beacons 108 and 109, and allows a user to take actions with respect to beacons 108 and 109.

Although discussion has been made of applications and applications on client computing device 102 and remote server 104, the applications may also be, in some embodiments, modules. Module, as used herein, may refer to a software module that performs a function when executed by one or more processors or Application Specific Integrated Circuit (ASIC) or other circuit having memory and at least one processor for executing instructions to perform a function, such as the functions described as being performed by the applications.

Figure 2:
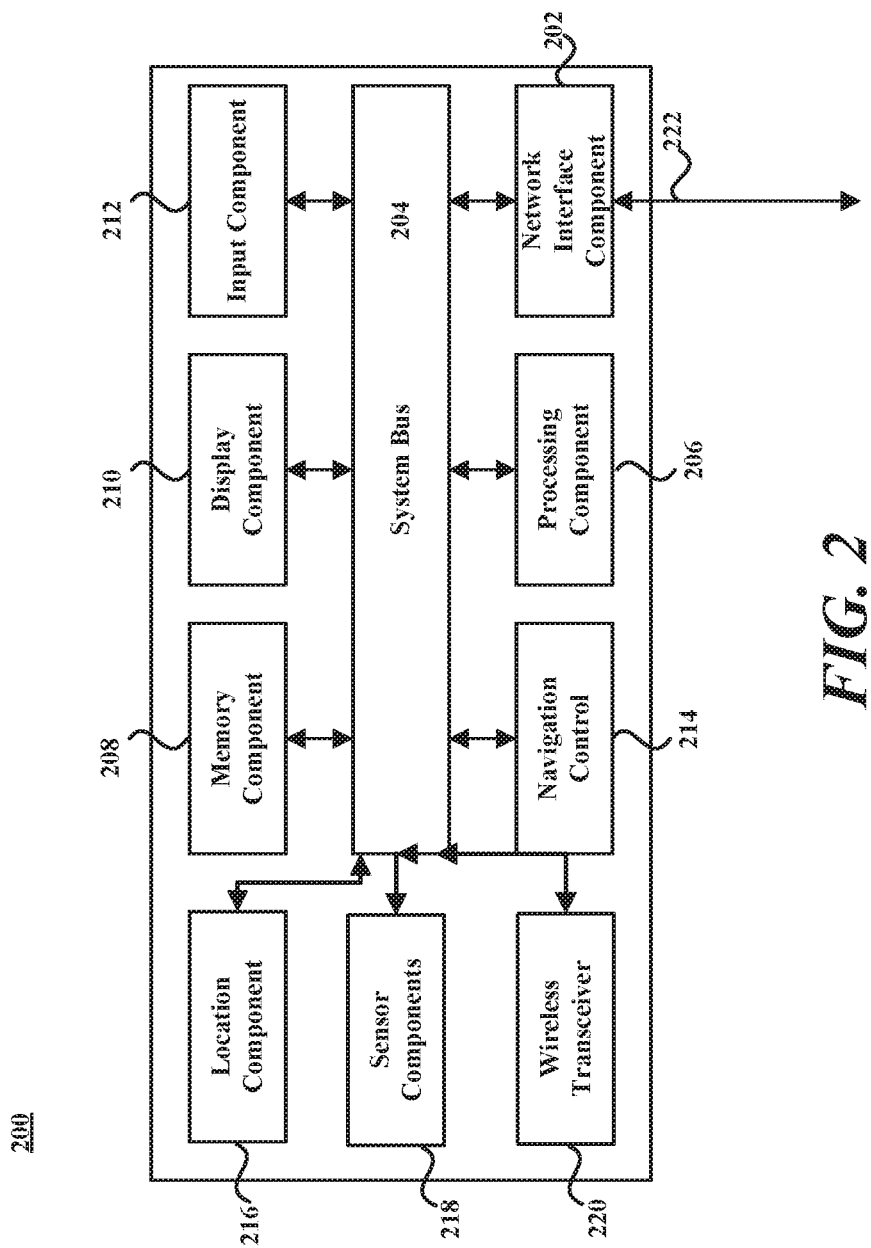
FIG. 2 is a diagram illustrating a computing system, consistent with some embodiments.

FIG. 2 is a diagram illustrating computing system 200, which may correspond to either of client computing device 102 or remote server 104, consistent with some embodiments. Computing system 200 may be a mobile device such as a smartphone, a tablet computer, a personal computer, laptop computer, netbook, or tablet computer, set-top box, video game console, head-mounted display (HMD) or other wearable computing device as would be consistent with client computing device 102 or beacon management terminal 130. Further, computing system 200 may also be a server or one server amongst a plurality of servers, as would be consistent with remote server 104. As shown in FIG. 2, computing system 200 includes a network interface component (NIC) 202 configured for communication with a network such as network 108 shown in FIG. 1. Consistent with some embodiments, NIC 202 includes a wireless communication component, such as a wireless broadband component, a wireless satellite component, or various other types of wireless communication components including radio frequency (RF), microwave frequency (MWF), and/or infrared (IR) components configured for communication with network 106. Consistent with other embodiments, NIC 202 may be configured to interface with a coaxial cable, a fiber optic cable, a digital subscriber line (DSL) modem, a public switched telephone network (PSTN) modem, an Ethernet device, and/or various other types of wired and/or wireless network communication devices adapted for communication with network 106.

Consistent with some embodiments, computing system 200 includes a system bus 204 for interconnecting various components within computing system 200 and communicating information between the various components. Such components include a processing component 206, which may be one or more processors, micro-controllers, graphics processing units (GPUs) or digital signal processors (DSPs), and a memory component 208, which may correspond to a random access memory (RAM), an internal memory component, a read-only memory (ROM), or an external or static optical, magnetic, or solid-state memory. Consistent with some embodiments, computing system 200 further includes a display component 210 for displaying information to a user 120 of computing system 200. Display component 210 may be a liquid crystal display (LCD) screen, an organic light emitting diode (OLED) screen (including active matrix AMOLED screens), an LED screen, a plasma display, or a cathode ray tube (CRT) display. Computing system 200 may also include an input component 212, allowing for a user of computing system 200, such as consumer 120, to input information to computing system 200. Such information could include payment information such as an amount required to complete a transaction, account information, authentication information such as a credential, or identification information. An input component 212 may include, for example, a keyboard or key pad, whether physical or virtual. Computing system 200 may further include a navigation control component 214, configured to allow a user to navigate along display component 210. Consistent with some embodiments, navigation control component 214 may be a mouse, a trackball, or other such device. Moreover, if device 200 includes a touch screen, display component 210, input component 212, and navigation control 214 may be a single integrated component, such as a capacitive sensor-based touch screen.

Computing system 200 may further include a location component 216 for determining a location of computing system 200. In some embodiments, location component 216 may correspond to a GPS transceiver that is in communication with one or more GPS satellites. In other embodiments, location component 216 may be configured to determine a location of computing system 200 by using an internet protocol (IP) address lookup, or by triangulating a position based on nearby telecommunications towers or wireless access points (WAPs). Location component 216 may be further configured to store a user-defined location in memory component 208 that can be transmitted to a third party for the purpose of identifying a location of computing system 200. Computing system 200 may also include sensor components 218. Sensor components 218 provide sensor functionality, and may correspond to sensors built into client computing device 102 or sensor peripherals coupled to client computing device 102. Sensor components 218 may include any sensory device that captures information related to user 110 and/or client computing device 102 that may be associated with any actions that user 110 performs using client computing device 102. Sensor components 218 may include camera and imaging components, accelerometers, biometric readers, GPS devices, motion capture devices, and other devices that are capable of providing information about client computing device 102 or user 110, or an environment thereararound. Computing system 200 may also include one or more wireless transceivers 220 that may each include an antenna that is separable or integral and is capable of transmitting and receiving information according to one or more wireless network protocols, such as Wi-Fi™, 3G, 4G, LTE, RF, NFC, IEEE 802.11a, b, g, n, ac, or ad, Bluetooth®, BLE, WiMAX, ZigBee®, ANT, ANT+, etc.

Computing system 200 may perform specific operations by processing component 206 executing one or more sequences of instructions contained memory component 208. In other embodiments, hard-wired circuitry may be used in place of or in combination with software instructions to implement the present disclosure. Logic may be encoded in a computer readable medium, which may refer to any medium that participates in providing instructions to processing component 206 for execution, including memory component 208. Consistent with some embodiments, the computer readable medium is tangible and non-transitory. In various implementations, non-volatile media include optical or magnetic disks, volatile media includes dynamic memory, and transmission media includes coaxial cables, copper wire, and fiber optics, including wires that comprise system bus 204. According to some embodiments, transmission media may take the form of acoustic or light waves, such as those generated during radio wave and infrared data communications. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computing system 200. In various other embodiments of the present disclosure, a plurality of computing systems 200 coupled by a communication link 222 to network 108 (e.g., such as a LAN, WLAN, PTSN, and/or various other wired or wireless networks, including telecommunications, mobile, and cellular phone networks) may perform instruction sequences to practice the present disclosure in coordination with one another. Computing system 200 may transmit and receive messages, data and one or more data packets, information and instructions, including one or more programs (i.e., application code) through communication link 222 and network interface component 202 and wireless transceiver 220. Received program code may be executed by processing component 206 as received and/or stored in memory component 208.

Figure 3:
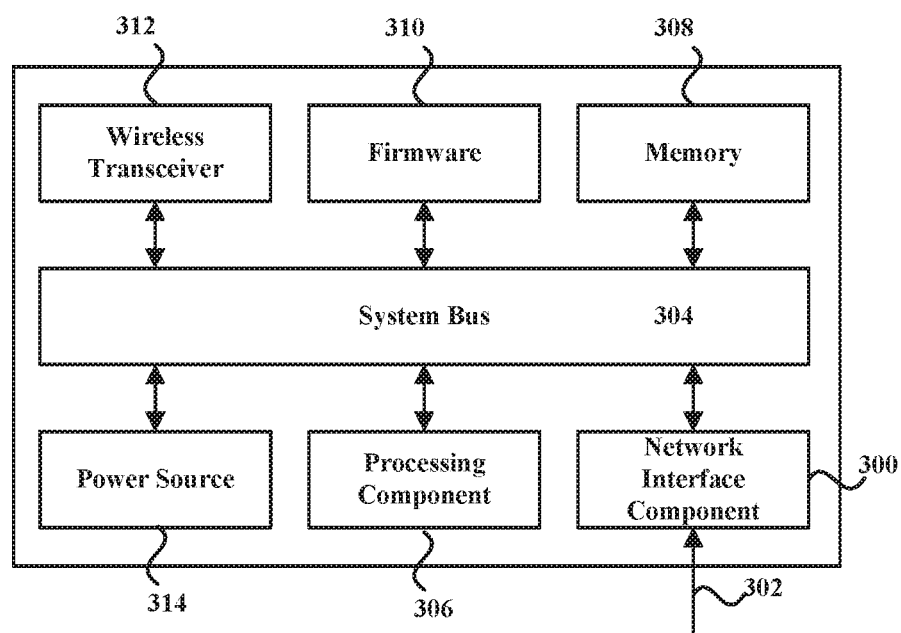
FIG. 3 is a diagram illustrating a primary beacon, consistent with some embodiments.

FIG. 3 is a diagram illustrating primary beacon 108, consistent with some embodiments. As shown in FIG. 3, primary beacon 108 includes a network interface component (NIC) 300 configured for communication with a network such as network 106 shown in FIG. 1. Consistent with some embodiments, NIC 300 includes a wireless communication component, such as a wireless broadband component, a wireless satellite component, or various other types of wireless communication components including radio frequency (RF), microwave frequency (MWF), and/or infrared (IR) components configured for communication 302 with network 106. Consistent with other embodiments, NIC 300 may be configured to interface with a coaxial cable, a fiber optic cable, a digital subscriber line (DSL) modem, a public switched telephone network (PSTN) modem, an Ethernet device, and/or various other types of wired and/or wireless network communication devices adapted for communication with network 106.

Primary beacon 108 also includes a system bus 304 for interconnecting various components within primary beacon 108 and communicating information between the various components. Such components include a processing component 306, which may be one or more processors, microcontrollers, graphics processing units (GPUs) or digital signal processors (DSPs), a memory component 308, firmware 310 and one or more wireless transceivers 312 that may each include an antenna that is separable or integral and is capable of transmitting and receiving information according to one or more wireless network protocols, such as Wi-Fi™, 3G, 4G, LTE, RF, NFC, IEEE 802.11a, b, g, n, ac, or ad, Bluetooth®, BLE, WiMAX, ZigBee®, ANT, ANT+, etc. In some embodiments, wireless transceivers 312 and network interface component 302 may be part of the same component, or may be separate components. In some embodiments, network interface component 302 and wireless transceivers 312 may be capable of communicating with a device based on instructions executed by processing component 306. In other embodiments, network interface component 302 and wireless transceivers 312 may include one or more processors capable of executing instructions for establishing communications and communicating information over an established communication. Primary beacon 108 may also include a power source 314. Power source 314 may be any power source capable of providing sufficient current to power the components of primary beacon 108. In some embodiments, power source 314 may be a battery, such as a watch battery or button cell.

In some embodiments, primary beacon 108 may be configured to transmit information using network interface component 302 and/or wireless transceivers 312 based on instructions stored in memory 308 and/or firmware 310 executed by processing component 306 or by one or more processors in network interface component 302 or wireless transceivers 312. The instructions may be stored in memory 308 and/or firmware 310 by directly writing the instructions to memory 308 and/or firmware 310 over communication link 302 to beacon hardware interface 300 or by wirelessly receiving instructions by wireless transceivers 312. In some embodiments, primary beacon 108 may be configured to transmit information related to checking in to a merchant associated with primary beacon 108. In some embodiments, primary beacon 108 may also transmit instructions that when received by client computing device 102 may cause check-in application 114 or payment application 116 to be executed by processing component 206 to cause client computing device 102 to perform a check-in at the merchant associated with primary beacon 108. Further, primary beacon 108 may transfer instructions that, when received by client computing device 102 cause payment application 116 to be executed by processing component to allow user 110 to authorize a payment to be processed by remote server 104. Primary beacon 108 may also send metadata to client computing device 102 that may include one or more protocol handlers that may be used to specify a particular check-in application to be executed and activated. In some embodiments, wireless transceiver 312 may correspond to a BLE transceiver configured to transmit and receive information according to the BLE protocol. In some embodiments, primary beacon 108 may be a BLE beacon or dongle such as described in U.S. patent application Ser. No. 13/938,860, filed on Jul. 10, 2013, the entire contents of which are hereby incorporated by reference in their entirety. Further, BLE beacon 108 may have a design such as shown in U.S. Design application No. 29/455,720, filed May 23, 2013, the entire contents of which are also incorporated herein by reference in their entirety.

In some embodiments, secondary beacon 109 may have a structure similar to the structure of primary beacon 108 illustrated in FIG. 3, but may not have a network interface component 300 capable of sending information over network 106. Rather, secondary beacon 109 may include one or more wireless transceivers, such as wireless transceiver 312, capable of communicating with wireless transceiver 312 of primary beacon 108 to send and receive information. Such communication may be made using the BLE protocol.

As will be readily appreciated, the foregoing networks, systems, devices, methods and variations thereof can be used to implement an automated check-in of users at a cooperating or subscribing establishment, such that subsequent purchase transactions and other activities can be more streamlined and convenient.

Figure 4:
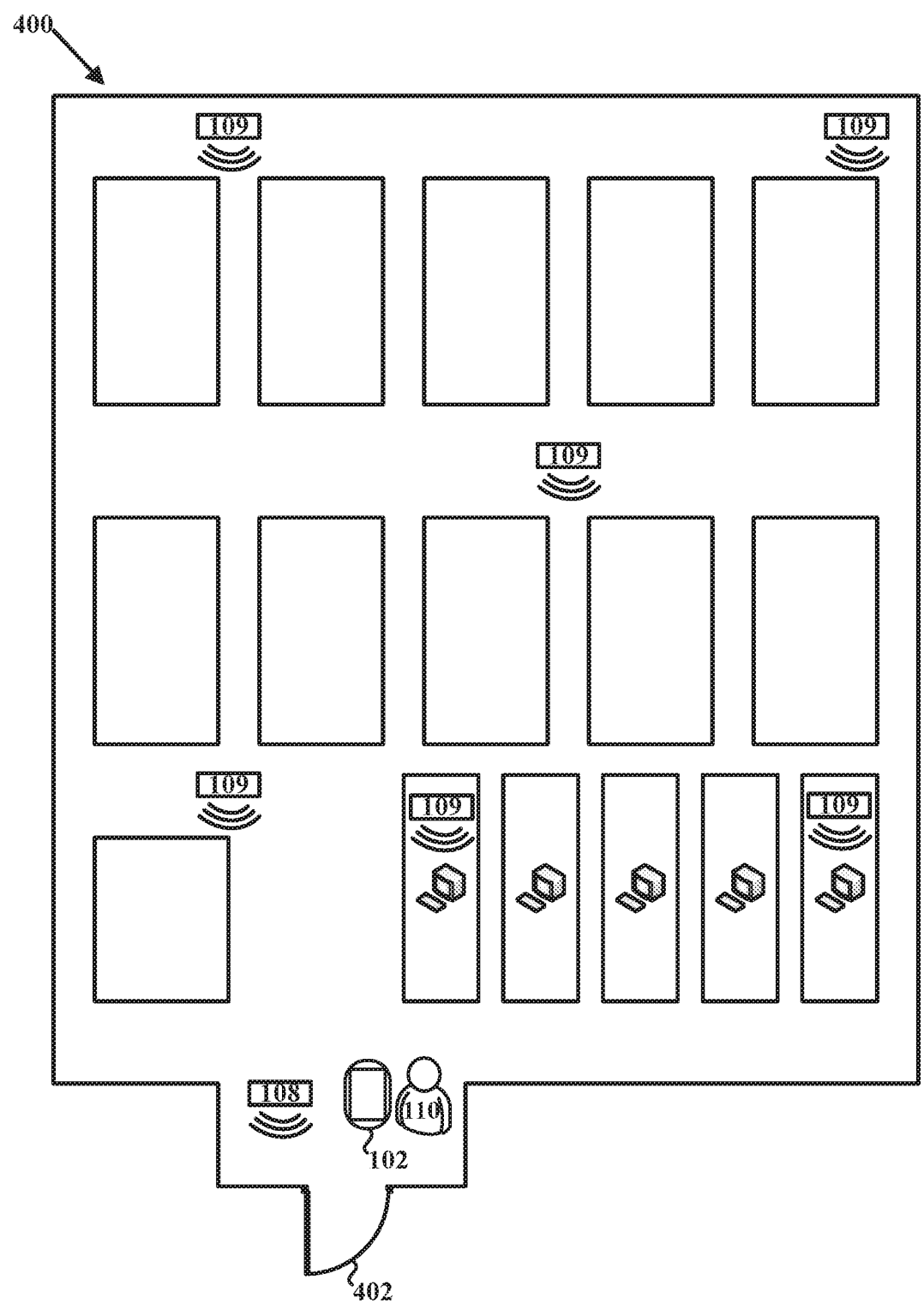
FIG. 4 is a diagram illustrating a location having multiple beacons throughout the location.

FIG. 4 illustrates in block diagram format an exemplary merchant location 400 and associated system components adapted for implementing the purchase of goods or services using automatic wireless consumer check-ins according to some embodiments. It will be readily appreciated that this particular layout of merchant location 400 is only provided for purposes of illustration, and that many other types of layouts, devices, procedures and the like could be effectively implemented using the various principles of the present disclosure.

Merchant location 400 includes an indoor store floor having a number of secondary beacons 109 and at least one primary beacon 108. In some embodiments, beacons 108 and 109 may be BLE beacons. These devices can be distributed strategically throughout merchant location, such as near the front door 402, at central locations, and/or at locations of high volume traffic within the establishment. One or more client computing devices 102 can interact with one or more of the beacons 108 or 109 throughout location 400. Preferably, only one interaction with primary beacon 108 is needed for a check-in, although it may be useful for an establishment to know where user 110 is located and/or where user 110 travels and shopping patterns or habits within location 400, which may be determined as user 110 subsequently establishes communications with secondary beacons 109 distributed throughout location 400. Such further information can be used to provide further advertising and promotional offers (e.g., related to something at or near where the user is physically located), and/or to authenticate the actual user versus one who may have stolen or is otherwise using the mobile device in an unauthorized fashion. Such further authentication can involve checking known user 110 traffic and shopping patterns against what is currently happening for a given device 102.

An actual automatic check-in process can involve a subscribed or affirmatively active user 110 entering a merchant location 400, whereupon client computing device 102 associated with user 110 has a low level background program such as check-in application 114 running that detects a low level BLE signal from primary beacon 108 in location 400. Client computing device 102 can then "wake up" and communicate on a more active level with primary beacon 108, which may include the activation of check-in application 114. In some embodiments, a device identifier and token can be generated and assigned to client computing device 102 for a particular time, location and session, with appropriate expiration and other safeguards in place to protect against fraud or other misuse. For example, a period of one or two hours might suffice for a typical check-in session or event. The process of establishing communications between client computing device 102 and primary beacon 108 and exchanging metadata and a one-time use beacon token to perform a check-in is described in U.S. patent application Ser. No. 13/938,860, filed on Jul. 10, 2013, and U.S. patent application Ser. No. 14/021,045, filed on Sep. 9, 2013, the entire contents of both of these applications which are hereby incorporated by reference in their entirety.

When user 110 having client computing device 102 enters location 400, user 110 may complete the automatic check-in facilitated by primary beacon 108, as discussed above. As user 110 having client computing device 102 moves throughout location, client computing device 102 may establish communications with one or more secondary beacons 109 positioned throughout location. In some embodiments, when client computing device 102 establishes communications with secondary beacon 109, secondary beacon 109 may send an offer, incentive, advertisement, and the like to client computing device 102, which may then be displayed to user 110 on display component 210 of client computing device 102. Secondary beacon 109 may receive the content, which may include offers, incentives, advertisements, and the like, from primary beacon 108, which may be in communication with the secondary beacons 109 using the BLE communications protocol or other wireless communications protocol. Primary beacon 108, in turn, may receive the content from remote server 104 or another advertisement server (not shown) over network 106. Moreover, primary beacon 108 may receive the content from remote server 104 as provided by beacon management terminal 130.

Secondary beacons 109 may also send operating information and status information, as well as information about user 110 and/or client computing device 102 to primary beacon 108 regarding communications between client computing device 102 and secondary beacon 109. For example, secondary beacon 109 may be capable of sending a message to primary beacon 109 that includes an identifier and/or location of secondary beacon 109, the time when client computing device 102 communicated with secondary beacon 109, the content that was provided to client computing device 102, a media access control (MAC) identifier associated with client computing device 102, other identifiers, or other information about user 110 and client computing device 102 such as may be included in communications between client computing device 102 and secondary beacon 109. This information may then be provided to remote server 104 which may use the information, for example, to determine a sub- or micro-location of user 110 within location 400. Moreover, the operating and status information provided by secondary beacon 109 may be viewed by a user of beacon management terminal 130 as provided by beacon management application 132 of remote server 104.

Figure 5:
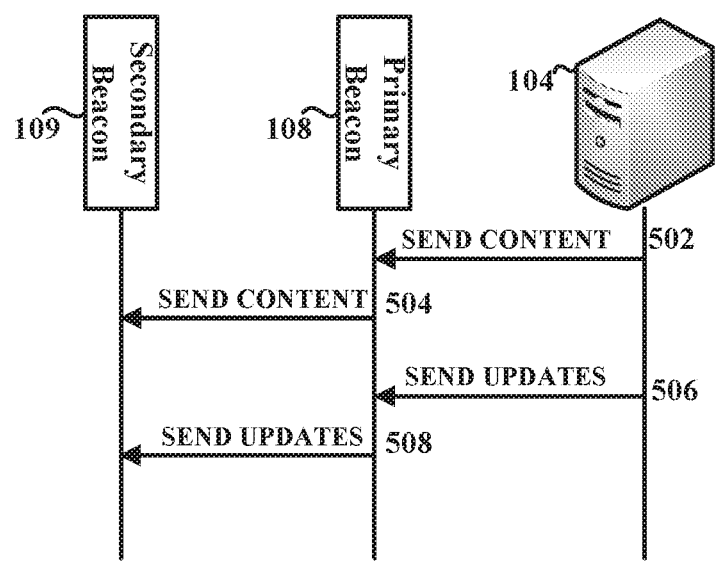
FIG. 5 is a diagram illustrating a flow for transmitting information from a remote server to a secondary beacon, consistent with some embodiments.

FIG. 5 is a diagram illustrating a flow for transmitting information from remote server 104 to secondary beacon 109, consistent with some embodiments. As shown in FIG. 5, when remote server 104 has content or updates to send to secondary beacon 109, remote server 104 may first send the content and/or updates to primary beacon 108 over network 106 (e.g., at 502 and 506). The provided content may include incentives, advertisements, offers, and the like. The provided updates may include software or firmware updates, or updated configuration files, updated content, and the like. The provided updates and content may be provided by beacon management terminal 130. Primary beacon 108 may then distribute the received content and updates to secondary beacon 109 in communication with primary beacon using, for example, the BLE communications protocol (e.g., at 504 and 508). As a result, only primary beacon 108 needs to be connected with remote server 104 over network 106 such that secondary beacons 109 can be smaller and less expensive.

Figure 6:
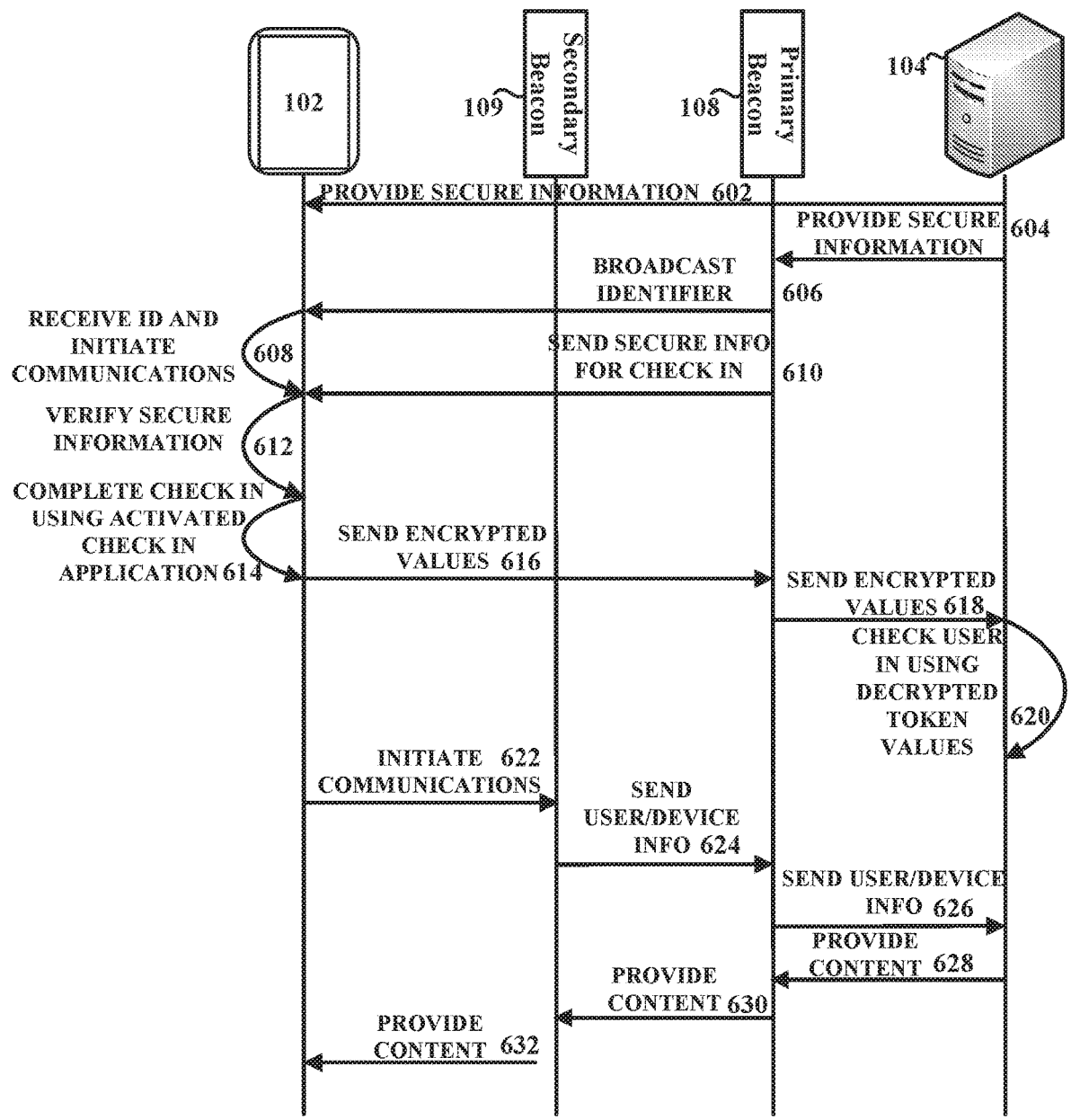
FIG. 6 is a diagram illustrating a flow for checking a user in at a location and using a secondary beacon in communication with a primary beacon to provide content to the secondary beacon and receive user or device information from the secondary beacon, consistent with some embodiments.

FIG. 6 is a diagram illustrating a flow for checking user 110 in at location 400 and using secondary beacon 109 in communication with primary beacon 108 to provide content to secondary beacon 109 and receive user or device information from secondary beacon 109, consistent with some embodiments. As shown in FIG. 6, remote server 104 may provide primary beacon 108 and client computing device 102 with secure information, which may include tokens and keys (e.g., at 602 and 604). In some embodiments, the tokens and keys may be one-time use payment tokens and associated keys wherein the associated keys may include a pair of symmetric keys and the tokens can each have, for example, a user identifier, a token value, a key serial number and an AES or other crypto key. In some embodiments, remote server 104 may provide primary beacon 108 with tokens and keys when primary beacon 108 is set up to work with remote server 104 for checking in users through remote server 104. Remote server 104 may further provide primary beacon 108 with digital signatures and merchant one-time use tokens that may be used to track check-ins and transactions. In some embodiments, tokens and keys may be provided to client computing device 102 when user 110 using client computing device 102 signs up for a check-in service provided by remote server 104 and/or when check-in application 114 is installed on client computing device 102.

Primary beacon 108 may then continuously broadcast a generic identifier (e.g., at 606). In some embodiments, the identifier may be a universally unique identifier (UUID) and the identifier may be broadcast using a BLE communications protocol. The broadcast identifier may be received by client computing device 102 to initiate communications with primary beacon 108 (e.g., at 608). Primary beacon 108 may then provide additional secure information, such as metadata, a specific one-time use beacon token, and a digital signature to client computing device 102 (e.g., at 610). In some embodiments, client computing device 102 may request the secure information from primary beacon 108 when communications are initiated with primary beacon 108. Check-in application 114 may be configured to certify and verify the secure information by using a public key received from remote server 104 (e.g., at 612). When the secure information is verified as authentic, check-in application 114 may then be used to complete the check-in (e.g., at 614). In some embodiments, the activated check-in application 114 may provide user 110 with the option to check-in. When user 110 accepts the check-in, processing component of client computing device 102 may encrypt values and send these encrypted values to primary beacon 108 (e.g., at 616). The encrypted values may be encrypted tokens received from remote server 104. Primary beacon 108 may then send the encrypted token values to remote server 104 which decrypts the values and checks in user 110 and client computing device 102 using the decrypted values (e.g., at 618 and 620). The process of checking in by communicating with a BLE beacon, such as primary beacon 108, is further described in in U.S. patent application Ser. No. 13/938,860, filed on Jul. 10, 2013, and U.S. patent application Ser. No. 14/021,045, filed on Sep. 9, 2013, the entire contents of both of these applications which are hereby incorporated by reference in their entirety.

Once client computing device 102 and user 110 have been checked in to location using primary beacon 108, client computing device 102 may initiate communications with one or more secondary beacons 109 using a BLE communications protocol (e.g., at 622). In some embodiments, a handshake may be performed between secondary beacon 109 and client computing device 102. Moreover, the handshake may include passing information received from primary beacon 108 during check-in. Secondary beacon 109 may determine some information about user 110 and/or client computing device 102 when communications are initiated, and may send this information to primary beacon 108 using a BLE communications protocol (e.g., at 624). The determined information may include an identifier and/or location of secondary beacon 109, the time when client computing device 102 communicated with secondary beacon 109, the content that was provided to client computing device 102, a media access control (MAC) identifier associated with client computing device 102, other identifiers, or other information about user 110 and client computing device 102 such as may be included in communications between client computing device 102 and secondary beacon 109. Primary beacon 108 may then relay this user 110 and/or device information to remote server 104, which may analyze or store the information (e.g., at 626). In some embodiments, the information may be used to track user 110 and/or determine a sub- or micro-location of user 110 within location 400.

In some embodiments, the information may be used to determine content to provide to user 110. The content may include incentives, advertisements, offers, and the like. Remote server 104 may provide the content to primary beacon 104 over network (e.g., at 628), which may then provide the information to secondary beacon 109 using BLE communications (e.g., at 630). Secondary beacon 109 may then, in turn, provide the information to client computing device 102 using BLE communications (e.g., at 632). In some embodiments, the content may be provided to secondary beacon 109 through primary beacon 108 without receiving user 110 or client computing device 102 information, as such information may be stored in secondary beacon 109 as content to provide when a connection occurs.

Figure 7:
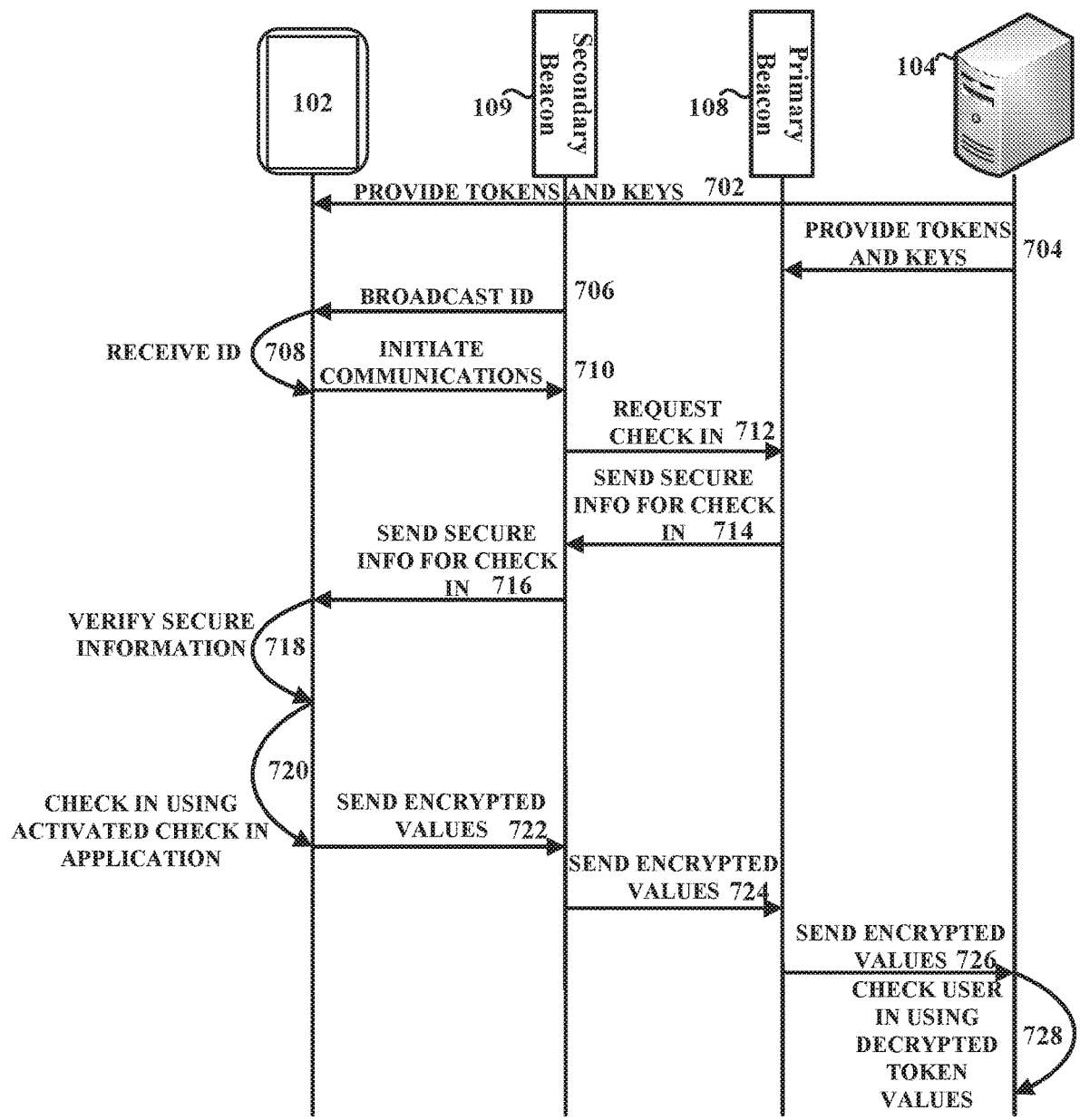
FIG. 7 is a flow diagram illustrating using a secondary beacon to facilitate a check-in, consistent with some embodiments.

FIG. 7 is a flow diagram illustrating using secondary beacon 109 to facilitate a check-in, consistent with some embodiments. As shown in FIG. 7, remote server 104 may provide primary beacon 108 and client computing device 102 with secure information, which may include tokens and keys (e.g., at 702). In some embodiments, the tokens and keys may be one-time use payment tokens and associated keys wherein the associated keys may include a pair of symmetric keys and the tokens can each have, for example, a user identifier, a token value, a key serial number and an AES or other crypto key. In some embodiments, remote server 104 may provide primary beacon 108 with tokens and keys when primary beacon 108 is set up to work with remote server 104 for checking in users through remote server 104 (e.g., at 704). Remote server 104 may further provide primary beacon 108 with digital signatures and merchant one-time use tokens that may be used to track check-ins and transactions. In some embodiments, tokens and keys may be provided to client computing device 102 when user 110 using client computing device 102 signs up for a check-in service provided by remote server 104 and/or when check-in application 114 is installed on client computing device 102.

Secondary beacon 108 may then continuously broadcast a generic identifier (e.g., at 706). In some embodiments, the identifier may be a universally unique identifier (UUID) and the identifier may be broadcast using a BLE communications protocol. The broadcast identifier may be received by client computing device 102 to initiate communications with secondary beacon 109 (e.g., at 708 and 710). Secondary beacon 109 may then send a check-in request to primary beacon 108 (e.g., at 712), and primary beacon 108 may then respond with additional secure information, such as metadata, a specific one-time use beacon token, and a digital signature (e.g., at 714). Secondary beacon 109 may then relay this secure information to client computing device 102 (e.g., at 716). The activated check-in application 114 may be configured to certify and verify the secure information by using a public key received from remote server 104 (e.g., at 718). When the secure information is verified as authentic, the activated check-in application 114 may then be used to complete the check-in (e.g., at 720). In some embodiments, the activated check-in application 114 may provide user 110 with the option to check-in. When user 110 accepts the check-in, client computing device 102 may encrypt values and send these encrypted values to secondary beacon 109 (e.g., at 722), and secondary beacon 109 may send the encrypted values to primary beacon 108 (e.g., at 724). The encrypted values may be encrypted tokens received from remote server 104. Primary beacon 108 may then send the encrypted token values to remote server 104 (e.g., at 726) which decrypts the values and checks in user 110 and client computing device 102 using the decrypted values (e.g., at 728).

Figure 8:
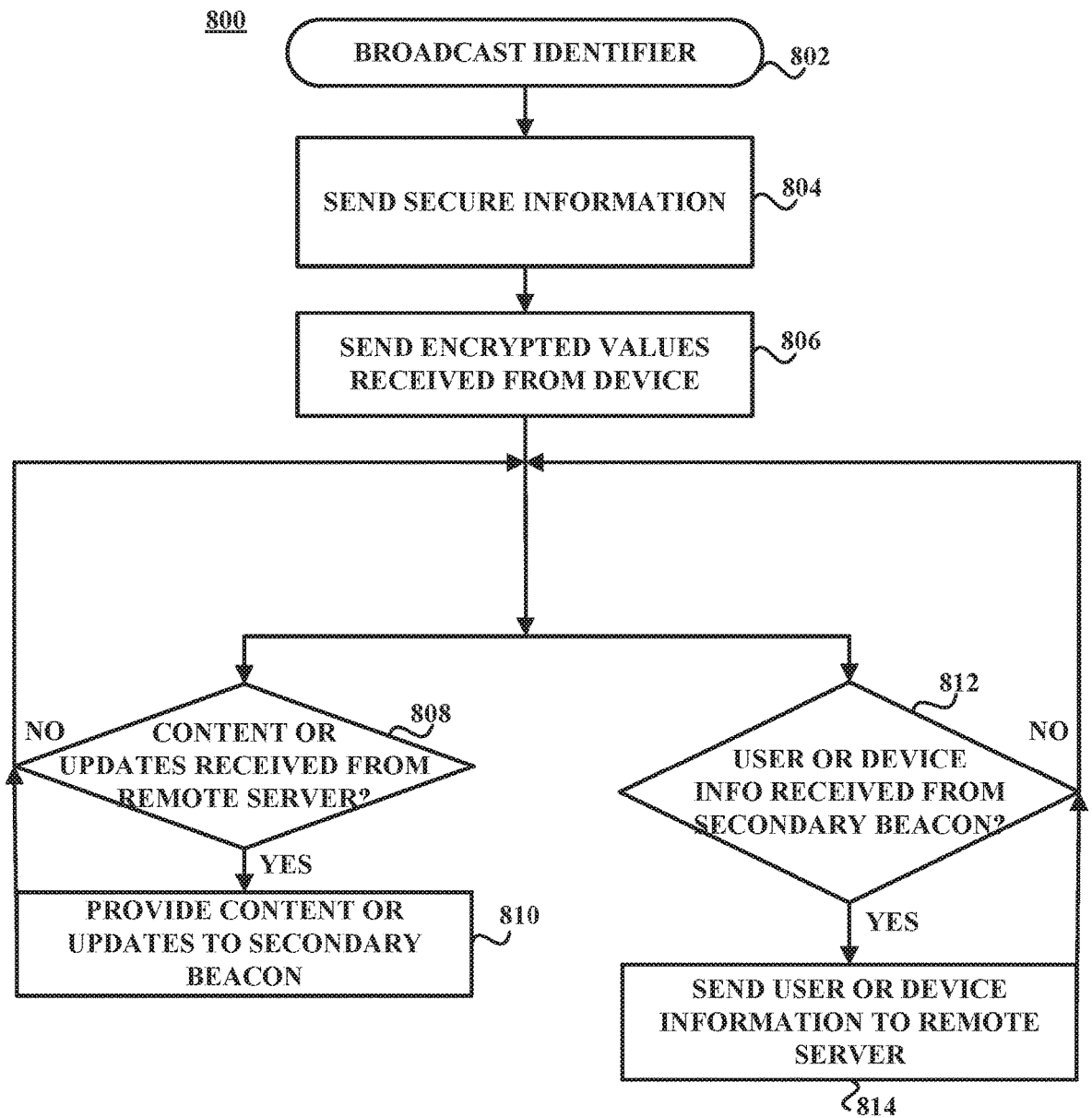
FIG. 8 is a flowchart illustrating a process for managing a secondary beacon, consistent with some embodiments.

FIG. 8 is a flowchart illustrating a process 800 for managing secondary beacon 109, consistent with some embodiments. For the purpose of illustration, FIG. 8 may be described with reference to any of FIGS. 1-7. Process 800 shown in FIG. 8 may be embodied in computer-readable instructions for execution by one or more processors such that one or more of the steps of the method may be performed by processing component 306 of primary beacon 108. As shown in FIG. 8, process 800 may begin when primary beacon 108 broadcasts an identifier (802). The identifier may be a generic identifier, such as a UUID. Primary beacon 108 may then send secure information to client computing device 102 in communication with primary beacon 108 (804). In some embodiments, primary beacon 108 may send the secure information as part of a check-in process or in response to a request received from client computing device 102. Primary beacon 108 may receive encrypted values from client computing device 102 as part of the check-in procedure and send these encrypted values to remote server to complete the check-in (806).

When there are content or updates to provide to secondary beacons 109 received from remote server 104 as provided by beacon management terminal 130 (808), primary beacon 108 may receive the content and updates from remote server 104 over network 106 and then provide the content or updates to secondary beacon 109 using BLE communications or other wireless communication protocols (810). Moreover, when primary beacon 108 receives information about user 110 or client computing device 102 from secondary beacon 109 (812), primary beacon 108 may send the information about user 110 or client computing device 102 to remote server 104 over network (814). Consequently, process 800 may allow a primary beacon to manage multiple secondary beacons by acting as an intermediary between secondary beacon 109, which may not be capable of communicating over network 106, and remote server 104, and be capable of providing information to secondary beacon 109 and from secondary beacon 109.

Figure 9:
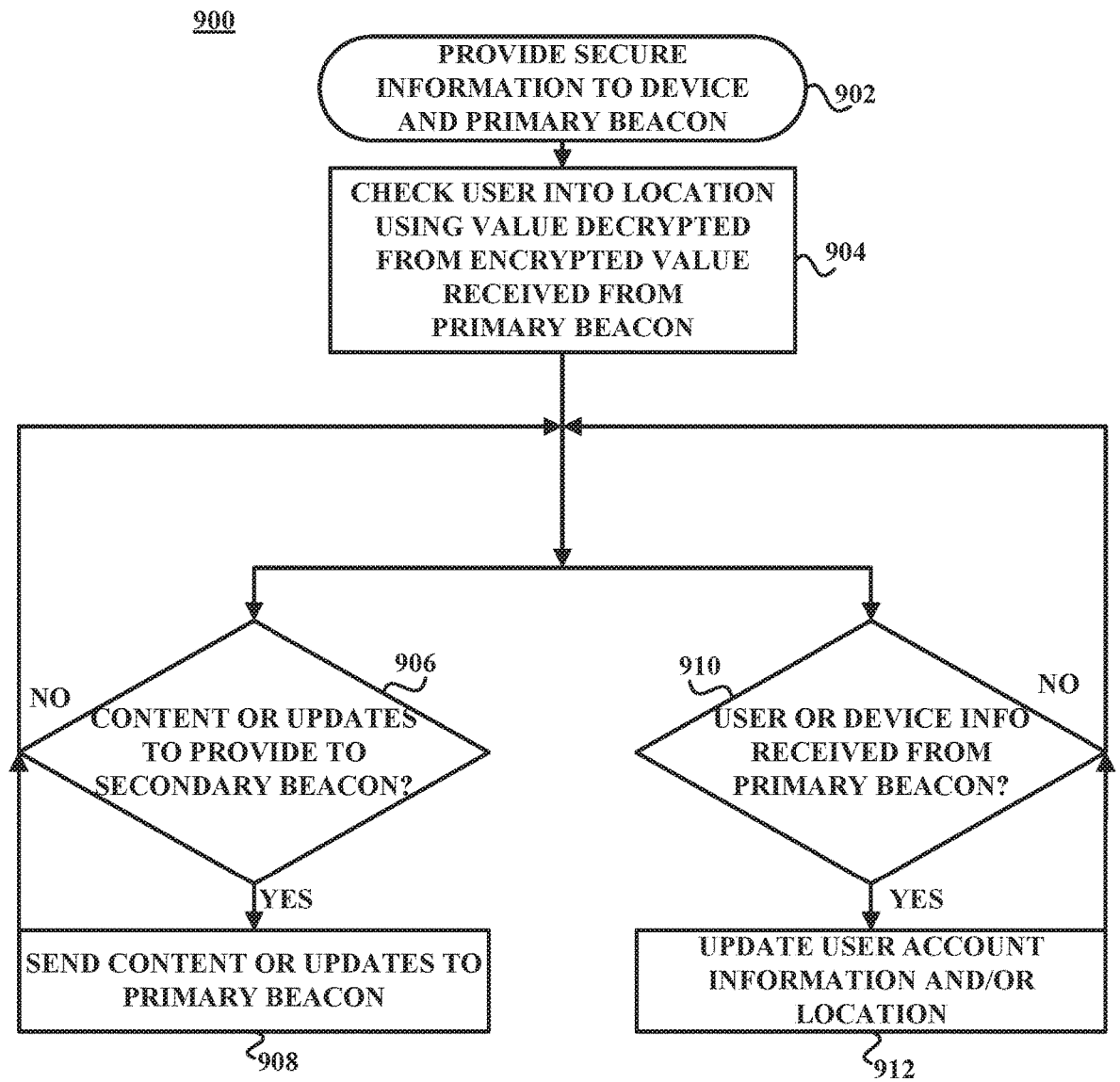
FIG. 9 is a flowchart illustrating a process for managing a secondary beacon, consistent with some embodiments.

FIG. 9 is a flowchart illustrating a process 900 for managing secondary beacon 109, consistent with some embodiments. For the purpose of illustration, FIG. 9 may be described with reference to any of FIGS. 1-7. Process 900 shown in FIG. 9 may be embodied in computer-readable instructions for execution by one or more processors such that one or more of the steps of the method may be performed by processing component 206 of remote server 104. As shown in FIG. 9, process 900 may begin when remote server 104 provides secure information to client computing device 102 and primary beacon 108 for use in securely checking user 110 into location 400 (902). After client computing device 102 and primary beacon 108 communicate, primary beacon 108 may receive encrypted values that will be sent to remote server 104, which may use the encrypted values to check user 110 into location 400 (904).

When there are content or updates to provide to secondary beacons 109 (906), remote server 104 may sent the content or updates to primary beacon 108 over network 106 (908). In some embodiments, the content and updates may be provided by beacon management terminal 130. Moreover, when primary beacon 108 receives information about user 110 or client computing device 102 from secondary beacon 109, remote server 104 may receive this information from primary beacon 108 (910) and then update an account of user 110 and/or determine a sub- or micro-location of user 110 in location 400 (912). In some embodiments, updating an account of user 110 may include storing the received information in account information 124 of account database 122. Consequently, process 900 may allow remote server 104 to send information to and receive information from a secondary beacon 109 through primary beacon 108 without the need for remote server 104 to be in communication with secondary beacon 109. Moreover, remote server 104 may receive operating and status information of secondary beacons 109 from primary beacon 108 as reported to primary beacon 108 and beacon management application 132 may be capable of presenting the received information for viewing by beacon management terminal 130 in communication with remote server 104 over network 106.

Software, in accordance with the present disclosure, such as program code and/or data, may be stored on one or more machine-readable mediums, including non-transitory machine-readable medium. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Embodiments described herein may provide systems and methods for managing beacons using a network-connected primary beacon that is in communication with a server through the network and in communication with other, cheaper beacons placed throughout the location through a Bluetooth® low energy (BLE) communications protocol. The primary beacon can be used to interact with a customer or user device to facilitate check-ins and payments with the server over the network and can be used to propagate content and updates to the secondary beacons throughout the location. Further, the secondary beacons can provide information about the customer or user to the primary beacon when the user device comes into communication with the secondary beacon such that the primary beacon can provide this information to the server to determine a sub- or micro-location with the location based on the secondary beacons to which the user is in communication. The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. A system comprising:
   a non-transitory memory; and
   one or more hardware processors coupled to the non-transitory memory and configured to read instructions from the non-transitory memory to cause the system to perform operations comprising:
   receiving, over a network connection from a remote server, a one-time use token for a short-range wireless transmitter, wherein the one-time use token comprises an activation process for an application on a mobile device;
   detecting the mobile device of a user within a wireless proximity range of the short-range wireless transmitter associated with a sub-location within a merchant location;
   establishing a wireless connection between the mobile device and the short-range wireless transmitter using a wireless communication protocol within the sub-location;
   activating the application on the mobile device via the short-range wireless transmitter using the one-time use token;
   receiving an identifier from the application via the short-range wireless transmitter; and
   populating a notification in at least one of the application on the mobile device or a merchant interface associated with the system at the sub-location based on the identifier and device information for the short-range wireless transmitter, wherein the notification associates the user with the sub-location.

2. The system of claim 1, wherein the sub-location comprises one of a checkout location, a payment location, or a return location, and wherein the short-range wireless transmitter is located in or within a proximity to a line of the sub-location.

3. The system of claim 1, wherein the short-range wireless transmitter comprises one of a plurality of short-range wireless transmitters throughout the merchant location that are range limited to prevent at least one of an overlap or an interference between the plurality of short-range wireless transmitters.

4. The system of claim 1, wherein the application comprises one of a checkout application or a payment application for an online transaction processor providing an account to the user.

5. The system of claim 1, wherein prior to the activating, the operations further comprise:
   providing an option to download or install the application on the mobile device.

6. The system of claim 1, wherein the application is activated in response to the user being detected as checking out or paying at the sub-location based on a transaction generated by the system via the merchant interface.

7. The system of claim 1, wherein the operations further comprise:
   processing an application check-in for the application on the mobile device at the sub-location using the identifier and the device information for the short-range wireless transmitter, wherein the application check-in further associates the user with the sub-location.

8. The system of claim 1, wherein the populating the notification comprises displaying a transaction between the mobile device and the system.

9. The system of claim 1, wherein the populating the notification comprises displaying available items to purchase.

10. The system of claim 1, wherein the populating the notification comprises displaying incentives or discounts of available items.

11. The system of claim 1, wherein the operations further comprise:
   generating a transaction based on data received from one of the mobile device or the merchant interface; and
   performing at least one of transmitting the transaction to the mobile device or displaying the transaction in the merchant interface for electronic transaction processing.

12. The system of claim 1, wherein the operations further comprise:
   transmitting the identifier to a server of a service provider;
   receiving information associated with an account corresponding to the identifier; and
   providing item information for an item available within the sub-location based on the information.

13. A method comprising:
   detecting a mobile device of a user entering a checkout location within a mobile location using short-range wireless communications from a wireless beacon;
   connecting to the mobile device using the short-range wireless communications at the checkout location;

transmitting an application activation token to the mobile device via the short-range wireless communications from the wireless beacon, wherein the application activation token is limited to a single use with the mobile device;

initiating an application on the mobile device based on the application activation token;

receiving an identifier from the application, wherein the identifier is associated with an account of the user with an online transaction processor;

determining the account with the online transaction processor using the identifier; and transmitting transaction processing data for a transaction available at the checkout location with the mobile device based on the identifier and the account.

14. The method of claim 13, wherein the wireless beacon is associated with one of a plurality of lanes of the checkout location and comprises one of a plurality of wireless beacons each associated with one of the plurality of lanes.

15. The method of claim 13, wherein the transaction processing data further comprises advertising data or available product data for items associated with the checkout location.

16. The method of claim 13, wherein the transaction processing data is usable with a checkout device at the checkout location.

17. The method of claim 14, further comprising:

processing the transaction with the mobile device using the account.

18. A non-transitory machine-readable medium having stored thereon machine-readable instructions executable to cause a machine to perform operations comprising:

establishing a wireless connection between a mobile device and a short-range wireless transmitter using a wireless communication protocol when the mobile device is within a wireless proximity range associated with a checkout location in a merchant location;

determining a digital token associated with an application on the mobile device, wherein the digital token comprises an executable process to cause the application to open an interface and is single use limited for use with the mobile device;

transmitting a notification to the mobile device requesting an opening or an activation of the application on the mobile device via the wireless connection, wherein the notification includes the digital token;

detecting the opening or the activation of the application, wherein the opening or the activation causes the application to open the interface;

receiving an identifier from the application via the wireless connection; and populating item data associated with the identifier in the interface of the application of the mobile device via the wireless connection.

19. The non-transitory machine-readable medium of claim 18, wherein the short-range wireless transmitter is located at a checkout register in the checkout location and range limited to connect with devices within the wireless proximity range to the checkout register.

20. The non-transitory machine-readable medium of claim 19, wherein the item data comprises one or more incentives for a transaction available for processing the transaction with the checkout register.

* * * * *